United States Patent
Rao et al.

(10) Patent No.: US 9,753,648 B2
(45) Date of Patent: *Sep. 5, 2017

(54) FIXED SIZE EXTENTS FOR VARIABLE SIZE DEDUPLICATION SEGMENTS

(71) Applicant: Quest Software Inc., Aliso Viejo, CA (US)

(72) Inventors: Goutham Rao, Los Altos, CA (US); Vinod Jayaraman, San Francisco, CA (US)

(73) Assignee: Quest Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,809

(22) Filed: Feb. 8, 2016

(65) Prior Publication Data

US 2016/0154588 A1    Jun. 2, 2016

Related U.S. Application Data

(63) Continuation of application No. 13/415,324, filed on Mar. 8, 2012, now Pat. No. 9,256,609.

(51) Int. Cl.
*G06F 17/30*    (2006.01)
*G06F 3/06*    (2006.01)

(52) U.S. Cl.
CPC .......... *G06F 3/0608* (2013.01); *G06F 3/065* (2013.01); *G06F 3/067* (2013.01); *G06F 3/0619* (2013.01); *G06F 3/0641* (2013.01); *G06F 17/30156* (2013.01)

(58) Field of Classification Search
CPC ................................................ G06F 17/30156

USPC ........................................................ 707/692
See application file for complete search history.

(56) References Cited

U.S. PATENT DOCUMENTS

| | | | | |
|---|---|---|---|---|
| 8,407,428 B2 * | 3/2013 | Cheriton | .................. | G06F 12/10 711/153 |
| 8,577,851 B2 * | 11/2013 | Vijayan | .................. | G06F 3/0652 707/692 |
| 8,712,963 B1 * | 4/2014 | Douglis | .............. | G06F 11/2094 707/625 |
| 8,745,338 B1 * | 6/2014 | Yadav | ............... | G06F 17/30153 707/693 |

(Continued)

OTHER PUBLICATIONS

"3Gen Data Deduplication Technical Discussion—White Paper", 3Gen Data Systems, Retrieved from the Internet: <URL:http://www.3gendata.com/whitepaper/3Gen_DataDedup_white_paper_new.pdf>, retrieved Mar. 8, 2012, 9 pgs.

(Continued)

*Primary Examiner* — Noosha Arjomandi
(74) *Attorney, Agent, or Firm* — Kwan & Olynick LLP (57) ABSTRACT

Mechanisms are provided for maintaining variable size deduplication segments using fixed size extents. Variable size segments are identified and maintained in a datastore suitcase. Duplicate segments need not be maintained redundantly but can be managed by updating reference counts associated with the segments in the datastore suitcase. Segments are maintained using fixed size extents. A minor increase in storage overhead removes the need for inefficient recompaction when a segment is removed from the datastore suitcase. Fixed size extents can be reallocated for storage of new segments.

20 Claims, 7 Drawing Sheets

(56) References Cited

U.S. PATENT DOCUMENTS

| | | | |
|---|---|---|---|
| 8,918,378 B1* | 12/2014 | Faith | G06F 3/067 707/695 |
| 8,924,366 B2* | 12/2014 | Bromley | G06F 17/30156 707/692 |
| 8,983,952 B1* | 3/2015 | Zhang | G06F 7/00 707/736 |
| 9,069,478 B2* | 6/2015 | Hirsch | G06F 3/0641 |
| 9,069,707 B1* | 6/2015 | Fortson | G06F 17/30159 |
| 9,110,936 B2* | 8/2015 | Li | G06F 17/3033 |
| 9,256,609 B2 | 2/2016 | Rao et al. | |
| 9,268,832 B1* | 2/2016 | Challapalli | G06F 17/3007 |
| 9,448,739 B1* | 9/2016 | Nagarkar | G06F 3/0641 |
| 2010/0088296 A1* | 4/2010 | Periyagaram | G06F 3/061 707/705 |
| 2010/0125553 A1 | 5/2010 | Huang et al. | |
| 2010/0274772 A1* | 10/2010 | Samuels | G06F 17/30233 707/693 |
| 2011/0071989 A1* | 3/2011 | Wilson | G06F 17/30156 707/692 |
| 2011/0099351 A1* | 4/2011 | Condict | G06F 3/0608 711/216 |
| 2011/0125719 A1* | 5/2011 | Jayaraman | G06F 17/30156 707/692 |
| 2012/0278382 A1* | 11/2012 | Faith | G06F 3/064 709/203 |
| 2012/0330903 A1* | 12/2012 | Periyagaram | G06F 3/0608 707/692 |
| 2013/0018853 A1* | 1/2013 | Jayaraman | G06F 3/0641 707/692 |
| 2013/0086007 A1* | 4/2013 | Bandopadhyay | G06F 17/30156 707/692 |
| 2013/0238570 A1 | 9/2013 | Rao et al. | |
| 2014/0195725 A1* | 7/2014 | Bennett | G06F 12/0246 711/103 |

OTHER PUBLICATIONS

"U.S. Appl. No. 13/415,324, Examiner Interview Summary mailed Nov. 30, 2015", 2 pgs.

"U.S. Appl. No. 13/415,324, Non Final Office Action mailed Jun. 16, 2015", 11 pgs.

"U.S. Appl. No. 13/415,324, Notice of Allowance mailed Nov. 25, 2015", 12 pgs.

Lillibridge, Mark et al., "Sparse Indexing: Large Scale, Inline Deduplication Using Sampling and Locality", HP Laboratories, Retrieved from the Internet: <http://www.hpl.hp.com/techreports/2009/HPL-2009-122.pdf>, Accessed on Dec. 29, 2013, Jun. 6, 2009, 14 pgs.

Yang, Tianming et al., "DEBAR: A Scalable High-Performance Deduplication Storage System for Backup and Archiving", CSE Technical Reports, University of Nebraska-Lincoln, Retrieved from the Internet: <http://digitalcommons.unl.edu/cgi/viewcontent.cgi?article=1059&context=csetechreports>, Accessed on Dec. 29, 2013, Jan. 5, 2009, 20 pgs.

* cited by examiner

Figure 1

Datastore Suitcase 101

Segment A 103
Reference Count 3

Segment B 105
Reference Count 1

Segment C 107
Reference Count 5

Segment D 109
Reference Count 3

Figure 2

| Datastore Suitcase 201 | |
|---|---|
| Segment A 203<br>Reference Count 3 | 221 |
| | 223 |
| | 225 |
| Segment B 205<br>Reference Count 1 | 227 |
| | 229 |
| | 231 |
| | 233 |
| | 235 |
| | 237 |
| Segment C 207<br>Reference Count 5 | 239 |
| | 241 |
| Segment D 209<br>Reference Count 3 | 243 |
| | 245 |
| | 247 |
| | 249 |
| | 251 |

| Dictionary 401 ||
|---|---|
| Fingerprint 411 | Storage Location 421 |
| a | Location 423 |
| b | Location 425 |
| c | Location 427 |

| Dictionary 451 ||
|---|---|
| Fingerprint 461 | Storage Location 471 |
| i | Location 473 |
| j | Location 475 |
| k | Location 477 |

FIXED SIZE EXTENTS FOR VARIABLE SIZE DEDUPLICATION SEGMENTS

CROSS-REFERENCE TO RELATED APPLICATIONS

This application is a continuation of and claims benefit under 35 U.S.C. §120 to U.S. application Ser. No. 13/415,324, filed Mar. 8, 2012 and titled "FIXED SIZE EXTENTS FOR VARIABLE SIZE DEDUPLICATION SEGMENTS", issued as U.S. Pat. No. 9,256,609 on Feb. 9, 2016, the entirety of which is incorporated herein by reference for all purposes.

TECHNICAL FIELD

The present disclosure relates to using fixed size extents for storage of variable size deduplication segments.

DESCRIPTION OF RELATED ART

Maintaining vast amounts of data is resource intensive not just in terms of the physical hardware costs but also in terms of system administration and infrastructure costs. Mechanisms for reducing resource usage include compression and deduplication. Compression involves encoding bit sequences using a reduced number of bits. Some file formats themselves are already compressed, while other file formats can be compressed using a variety of available utilities.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented as a full file, in fixed size segments, or in variable size segments.

Full file segment deduplication is straightforward, but entire files must be redundant before resource usage can be reduced. Fixed size segment deduplication is also relatively simple. The first segment typically starts at byte zero in a file and assumes fixed size segments lengths from that origin. If another file has many common sequences with a file being deduplicated, but at slightly different offsets, then these common sequences would not be detected. This is common in files that may share similar elements, but have slightly different structures or offsets.

Variable size segment deduplication or sliding window deduplication provides significant benefits over full file deduplication and fixed size segment deduplication. In a variable size segment deduplication system, the start and the end of a segment within a file is variable and can start and end anywhere. The content itself can be used to control where a segment starts and ends to increase the probability of finding identical segments elsewhere in the file or in other files. Each segment is provided with a segment identifier (ID), such as a digital signature or a hash of the actual data. Once the segment ID is generated, it can be used to determine if the data segment already exists in the system. If the data segment already exists, a reference count can be updated and the data segment need not be stored again.

However, mechanisms for efficiently handling storage resources in a variable size segment deduplication system are limited. Consequently, techniques and mechanisms are provided to improve variable size segment deduplication by using fixed size extents.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular compute nodes and network interfaces. However, it should be noted that the techniques and mechanisms of the present invention apply to a variety of different compute nodes and network interfaces. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

OVERVIEW

Mechanisms are provided for maintaining variable size deduplication segments using fixed size extents. Variable size segments are identified and maintained in a datastore suitcase. Duplicate segments need not be maintained redundantly but can be managed by updating reference counts associated with the segments in the datastore suitcase. Segments are maintained using fixed size extents. A minor increase in storage overhead removes the need for inefficient recompaction when a segment is removed from the datastore suitcase. Fixed size extents can be reallocated for storage of new segments.

EXAMPLE EMBODIMENTS

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers and reduce the associated network traffic. A variety of utilities compress files on an individual basis prior to writing data to file servers. Compression algorithms are well developed and widely available. Some compression algorithms target specific types of data or specific types of files. Compression algorithms operate in a variety of manners, but many compression algorithms analyze data to determine source sequences in data that can be encoded using shorter code words. In many implementations, the most frequent source sequences or the most frequent long source sequences are replaced with the shortest possible code words.

Data deduplication reduces storage footprints by reducing the amount of redundant data. Deduplication may involve identifying full file, fixed size, or variable size segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, a deduplication system searches for matching sequences using a sliding window and uses references to identify matching sequences instead of storing the matching sequences again.

In a data deduplication system, the backup server working in conjunction with a backup agent identifies candidate files for backup, creates a backup stream and sends the data to the deduplication system. A typical target system in a deduplication system will deduplicate data as data segments are received. A block that has a duplicate already stored on the deduplication system will not need to be stored again. However, other information such as references and reference counts may need to be updated. Some implementations allow the candidate data to be directly moved to the deduplication system without using backup software by exposing a NAS drive that a user can manipulate to backup and archive files.

In deduplication systems, storage resource management including garbage collection is an important aspect affecting system performance. In systems where full file deduplication or fixed size segment deduplication are used, storage resource management is straightforward. In the case of full file deduplication, duplicate files may be mapped to the same file system index node (inode). When the duplicate files are deleted, all corresponding data structures can be deleted without taxing the underlying file system.

In the case of fixed size segment deduplication, the segments that the inodes of the two files point to can be shared. Reference counts can be managed to determine how many files are sharing that segment. When the reference count goes to zero or to a value indicating that the segment is no longer being used by any file, the segment can be freed. The freed segments can be overwritten with new fixed size segments in a relatively efficient manner.

However, when dealing with variable sized streams, reclaiming unused storage space becomes difficult. According to various embodiments, multiple variable size segments are maintained in a datastore suitcase. A data structure such as a file used to maintain multiple variable size deduplication segments associated with reference counts is referred to herein as a datastore suitcase. When duplicate segments are added or removed from a deduplication system, reference counts are modified to account for the change in the number of files using particular variable size segments. In particular embodiments, it is recognized that inefficiencies arise when a reference number reaches a value such as 0 indicating that no files are using that segment and the segment needs to be removed. In many systems, it is difficult to reclaim the space occupied by that segment, since this segment resides within a datastore suitcase. The space occupied by that segment cannot easily be returned directly to the file system.

According to various embodiments, recompaction is typically used to reclaim the unused storage space. Recompaction involves reading the variable size segments and rewriting the segments which involves significant file system overhead. Recompaction can be time consuming and taxing on storage infrastructure.

Consequently, various techniques of the present invention use fixed size extents within each data store suitcase to provide the benefits of variable size segments along with the storage reuse efficiency of fixed size segments. Each fixed size extent may be as predetermined value such as 4 kB, 8 kB, 16 kB, etc. A fixed sequence of storage space is referred to herein as a fixed size extent. Variable size deduplication segments would occupy a particular number of fixed size extents. For example, an 11 kB variable size segment would consume three 4 kB extents or two 8 kB extents. Using fixed size extents within a file is generally highly inefficient for non-deduplication file systems due to the amount of wasted space in the extents. However, it is recognized that in a deduplication file system, the amount of wasted space is modest relative to the benefits obtained when storage has to be reclaimed in a garbage collection process.

According to various embodiments, reference counts are still maintained for entire segments, not individual fixed size extents, but usable space is tracked in terms of the number of available extents across datastore suitcases in a file system. In particular embodiments, if each extent is 4 kB and the average segment size is around 64 kB, each segment could have 6% storage waste. However, assuming a modest deduplication ratio such as 10:1, the wasted space would only be 0.6% per file.

In particular embodiments, in a fixed size extent system, when a reference count for a segment is zero, all extents occupied by that segment can immediately be queued for reuse by any new incoming data. No recompaction is necessary. According to various embodiments, segments also need not occupy consecutive extents. A segment can use as many extents as needed from one or more datastore suitcases.

Figure 1:
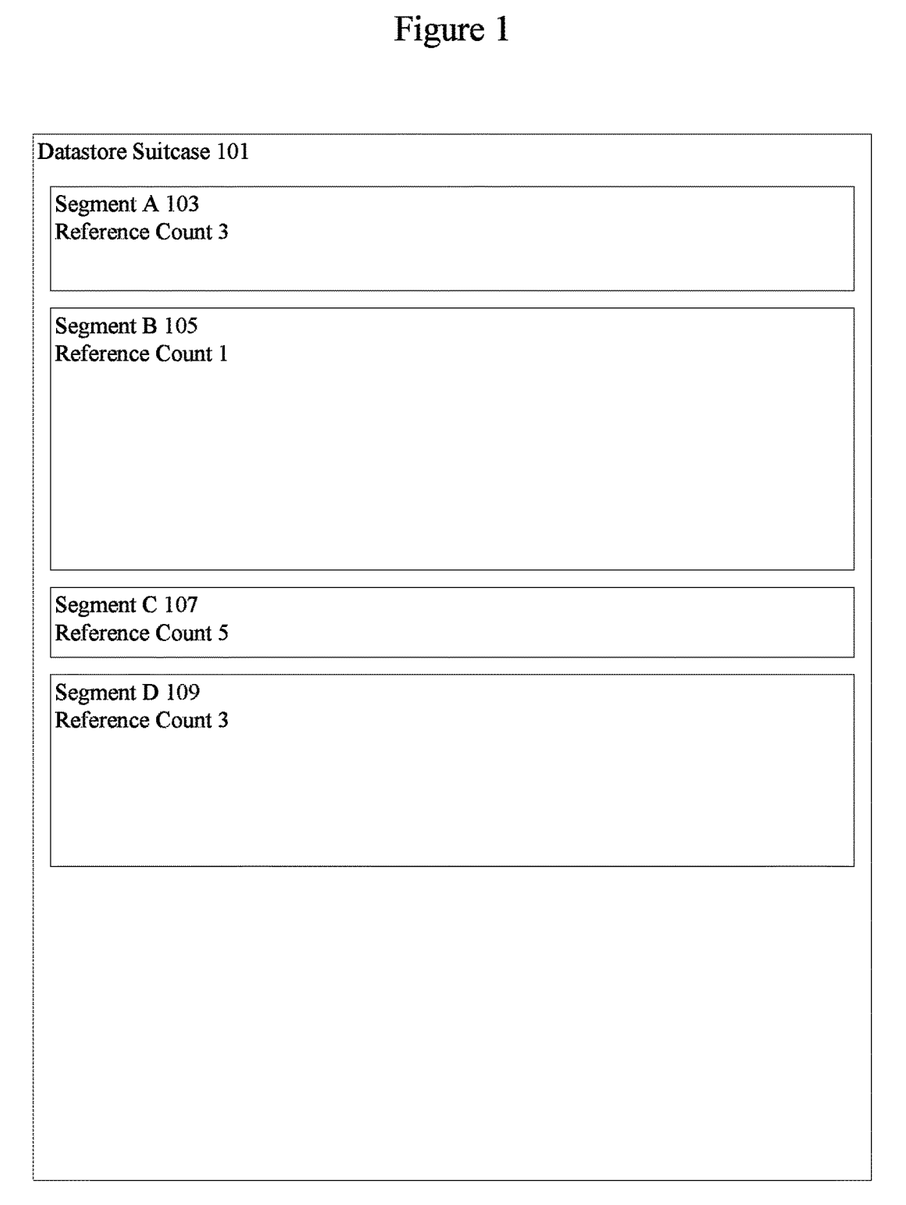
FIG. 1 illustrates a particular example of a datastore suitcase.

FIG. 1 illustrates one example of a variable size segment datastore suitcase. According to various embodiments, a datastore suitcase 101 maintains multiple deduplication segments. After a segment has been delineated, it is determined if the segment is already in a datastore suitcase. If it is not, the segment is added to a deduplication dictionary and stored in available space in a datastore suitcase such as datastore suitcase 101. File maps or object maps may be maintained to indicate where segments in particular files are maintained.

According to various embodiments, datastore suitcase 101 maintains segment A 103, segment B 105, segment C 107, and segment D 109. Segment A 103, segment B 105, segment C 107, and segment D 109 are referenced by files 3 times, 1 time, 5 times, and 3 times respectively. Reference counts are adjusted as duplicate segments are added to or removed from a deduplication system.

According to various embodiments, if the only file referencing segment B 105 is deleted or altered in a way that segment B 105 is no longer needed, the reference count is decremented to 0 and segment B 105 can be deleted. However, since segment B 105 is only a part of a larger datastore suitcase 101, segment B 105 cannot easily be removed. In typical instances, datastore suitcase 101 has to be recompacted. For example, segments are read and rewritten so that the space previously used by segment B 105 can now be used by segment C 107 or segment D 109. However, recompaction is resource intensive and taxes the underlying file system. Recompaction often consumes a significant portion of processing resources in a deduplication system.

Consequently, various techniques are provided to reduce or eliminate the need for recompaction in a variable size segment deduplication system. Space previously used by now deleted variable size segments can be reused for new variable size segments.

Figure 2:
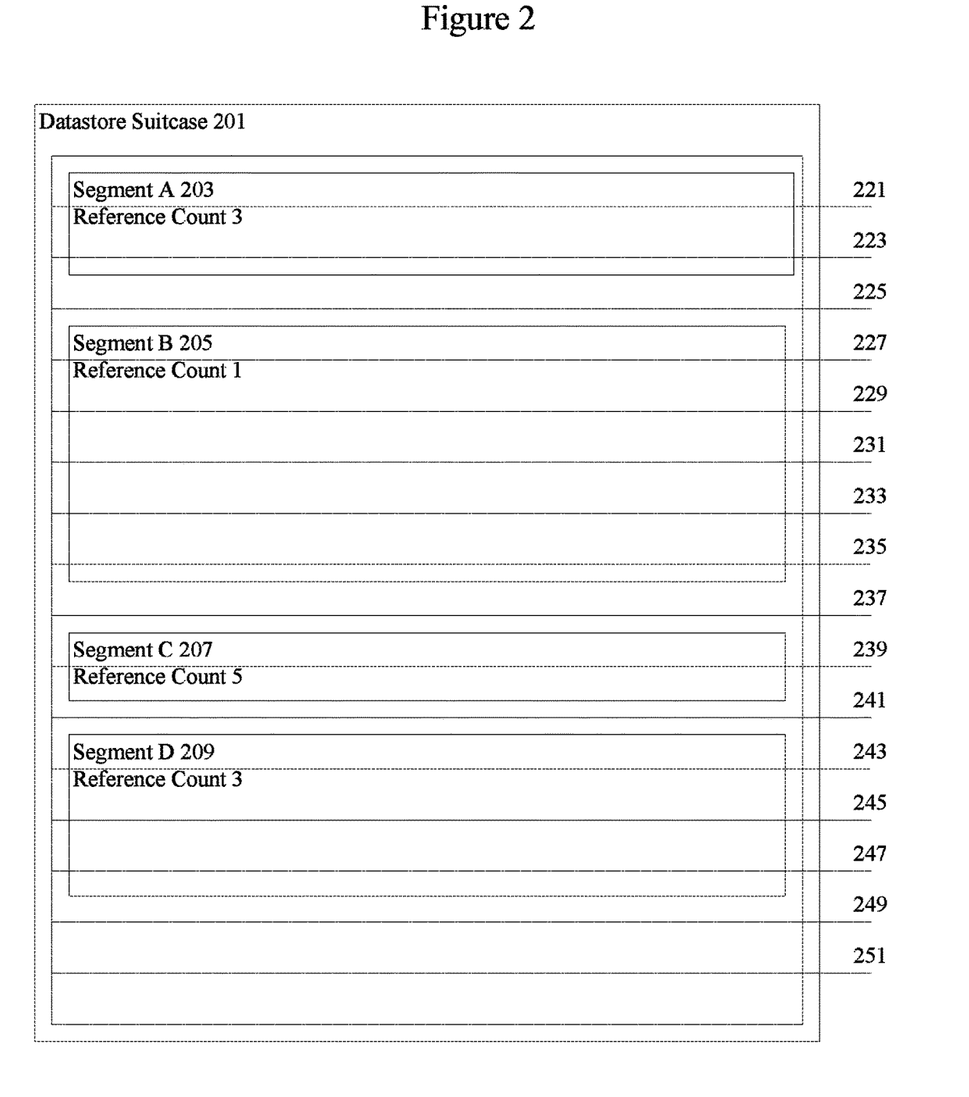
FIG. 2 illustrates a particular example of a datastore suitcase using fixed size extents.

FIG. 2 illustrates one example of a variable size segment datastore suitcase using fixed size extents. According to various embodiments, datastore suitcase 201 is delineated into fixed size extents including extents 221, 223, 225, 227, 229, 231, 233, 235, 237, 239, 241, 243, 245, 247, 249, and 251. In particular embodiments, extents are 4 kB or 8 kB in size. According to various embodiments, segments are divided for placement into the necessary number of extents. For example, segment A 203 having reference count 3 is maintained in extents 221, 223, and 225. Segment B 205 with reference count 1 is maintained in extents 227, 229, 231, 233, 235 and 237. Segment C 207 with reference count 5 is maintained in extents 239 and 241. Segment D 209 with reference count 3 is maintained in extents 243, 245, 247, and 249. Extent 251 is unused. It should be noted that segments need not be maintained in contiguous extents or even the same datastore suitcase.

According to various embodiments, if the reference count for segment B 205 is decremented, segment B 205 can be deleted and extents 227, 229, 231, 233, 235, and 237 can be reclaimed for storage of new segments. The freed extents 227, 229, 231, 233, 235, and 237 can be used to store one or more new segments or portions of one or more new segments. Although some storage space is wasted, in segments such as segments 225 and 249, having fixed size segments allows storage space to be reclaimed efficiently without requiring recompaction.

According to various embodiments, data is scanned to calculate appropriate segment boundaries. An algorithm such as Rabin may be used to determine appropriate boundary locations. Data is also scanned to determine segment fingerprints. The fingerprints may serve as identifiers for the segments in a deduplication dictionary. Metadata may be delineated for efficient access after deduplication. In particular embodiments, deduplication dictionaries and datastore suitcases may be generated, updated, and maintained in a distributed manner. Deduplication may be supplemented with compression and can be performed in-line or post-process.

Figure 3:
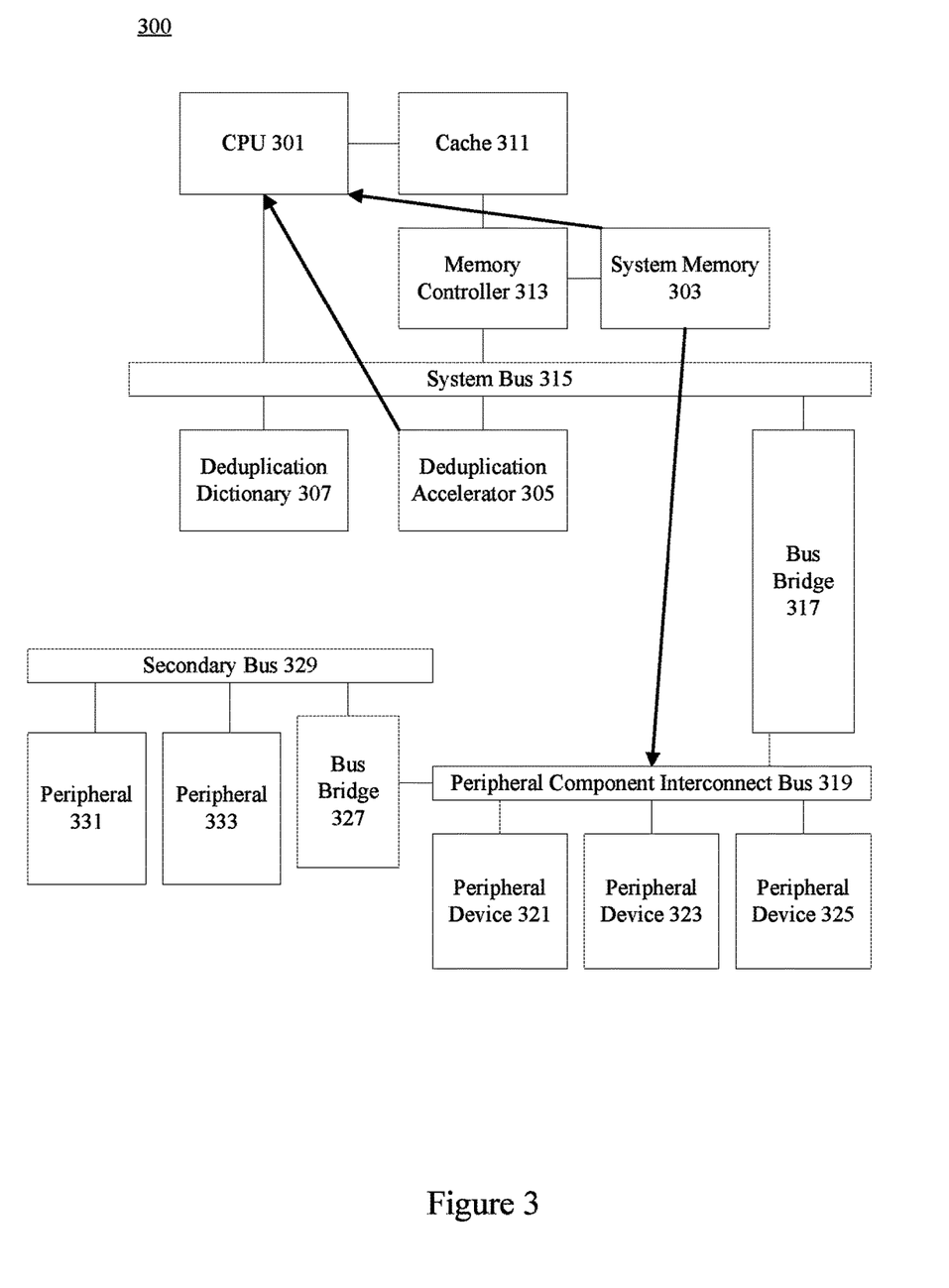
FIG. 3 illustrates a particular example of a system that can use the techniques and mechanisms of the present invention.

FIG. 3 illustrates a particular example of a system that can use the techniques and mechanisms of the present invention. According to various embodiments, data is received at an accelerated deduplication system 300 over an interface such as a network interface. A data stream may be received in segments or blocks and maintained in system memory 303. According to various embodiments, a processor or CPU 301 maintains a state machine but offloads boundary detection and fingerprinting to a deduplication engine or deduplication accelerator 305. The CPU 301 is associated with cache 311 and memory controller 313. According to various embodiments, cache 311 and memory controller 313 may be integrated onto the CPU 301.

In particular embodiments, the deduplication engine or deduplication accelerator 305 is connected to the CPU 301 over a system bus 315 and detects boundaries using an algorithm such as Rabin to delineate segments of data in system memory 303 and generates fingerprints using algorithms such as hashing algorithms like SHA-1 or MD-5. The deduplication engine 305 accesses the deduplication dictionary 307 to determine if a fingerprint is already included in the deduplication dictionary 307. According to various embodiments, the deduplication dictionary 307 is maintained in persistent storage and maps segment fingerprints to segment storage locations. In particular embodiments, segment storage locations are maintained in fixed size extents. Datastore suitcases, references, metadata, etc., may be created or modified based on the result of the dictionary lookup.

If the data needs to be transferred to persistent storage, the optimization software stack will communicate to the CPU 301 the final destination direct memory access (DMA) addresses for the data. The DMA addresses can then be used to transfer the data through one or more bus bridges 317 and/or 327 and secondary buses 319 and/or 329. In example of a secondary bus is a peripheral component interconnect (PCI) bus 319. Peripherals 321, 323, 325, 331, and 333 may be peripheral components and/or peripheral interfaces such as disk arrays, network interfaces, serial interfaces, timers, tape devices, etc.

Figure 4:
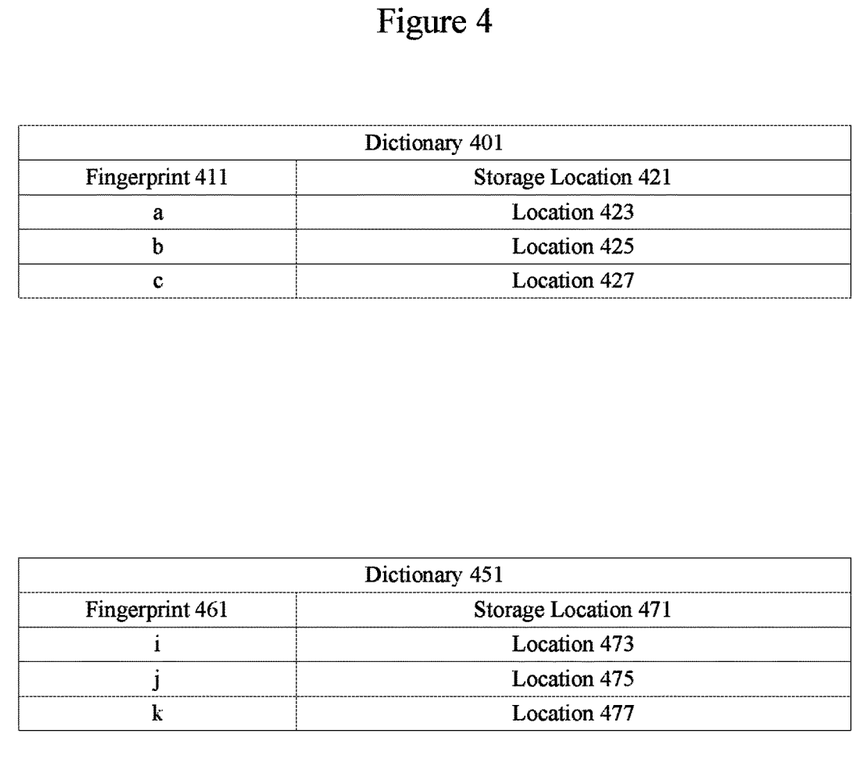
FIG. 4 illustrates a particular example of a deduplication dictionary.

FIG. 4 illustrates multiple dictionaries assigned to different fingerprints.

According to various embodiments, the fingerprint values are checksums or SHA/SHA1/SHA-256 hash values. In particular embodiments, dictionary 401 is a deduplication dictionary used by a first node and includes fingerprint ranges from 0x0000 0000 00000000-0x0000 0000 FFFF FFFF. Dictionary 451 is used by a second node and includes fingerprint ranges from 0x0000 0001 0000 0000-0X0000 0001 FFFF FFFF. Fingerprints 411 within the range for dictionary 401 are represented by symbols a, b, and c for simplicity. Fingerprints 461 within the range for dictionary 451 are represented by symbols i, j, and k for simplicity. According to various embodiments, each fingerprint in dictionary 401 is mapped to a particular storage location 421 such as location 423, 425, or 427. Each fingerprint in dictionary 451 is mapped to a particular storage location 471 such as location 473, 475, and 477.

Having numerous small segments increases the likelihood that duplicates will be found. However, having numerous small segments decreases the efficiency of using the dictionary itself as well as the efficiency of using associated object maps and datastore suitcases.

Figure 5:
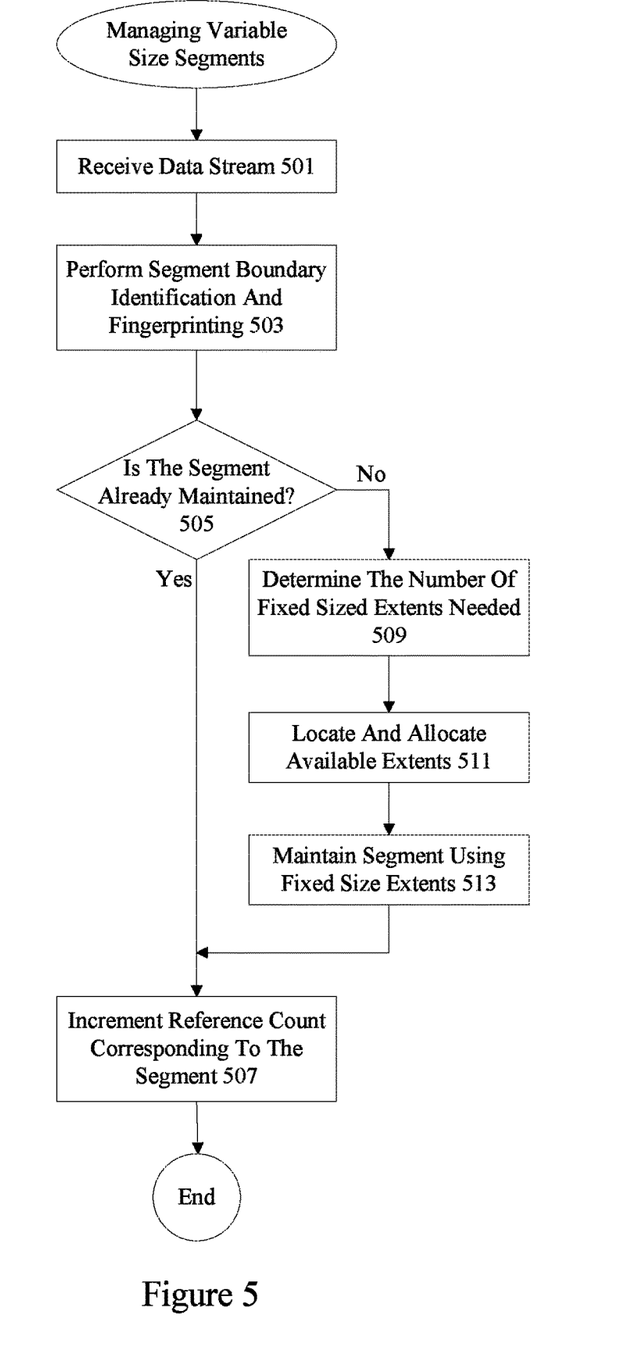
FIG. 5 illustrates a particular example of maintaining variable size segments using fixed size extents.

FIG. 5 illustrates a particular example of a technique for managing variable size segments maintained in a datastore suitcase with fixed size extents. According to various embodiments, a data stream is received at 501. The data stream may be a file, volume, or data block received in-line or post-process. That is, the data stream may be received while it is being transmitted for storage or may be received after data has already been stored. At 503, segment boundary identification and segment fingerprinting is performed to generate multiple variable size segments. In particular embodiments, boundaries are identified to increase the likelihood that duplicate segments will be detected. According to various embodiments, a deduplication dictionary is accessed at 505 to determine whether a particular segment is already maintained in a datastore suitcase and where the particular segment is located.

If the segment is already maintained, a reference count corresponding to the segment is incremented at 507. If the segment is not already stored, the number of fixed sized extents needed to maintain the segment is determined at 509. In particular embodiments, the size of a particular segment is greater than the size of an extent, and multiple extents are typically needed to maintain a single segment. Furthermore, because fixed size extents are being used, there may be left over space remaining in an extent. Consequently, the size of the fixed extents used to maintain the segment is typically greater than the size of the segment. However, techniques of the present invention recognize that this slight storage inefficiency is worth the benefits obtained through removing the need for recompaction.

Available extents are then located and allocated at 511. The segment is then maintained using the fixed size extents at 513. The fixed size extents may be contiguous, but may also be non-contiguous or even maintained in different datastore suitcases. Extent locations may be maintained in file maps or object maps or as part of a datastore suitcase itself.

Figure 6:
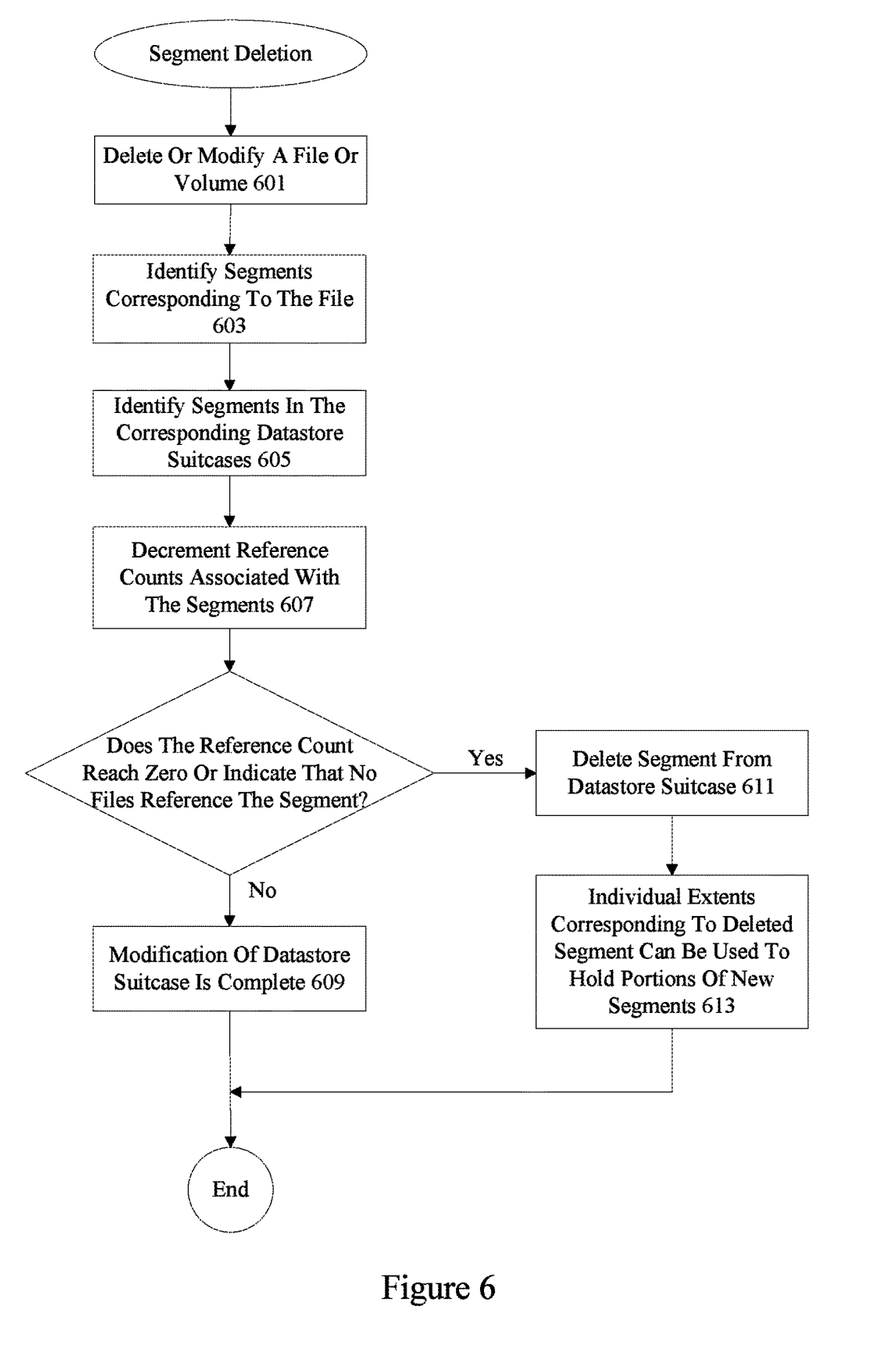
FIG. 6 illustrates a particular example of variable size segment deletion.

FIG. 6 illustrates one example of segment deletion. According to various embodiments, a file or volume is deleted or otherwise modified at 601. At 603, segments corresponding to the file are identified. In particular embodiments, the segments may be identified using a file map or object map that identifies files and corresponding segment locations. At 605, the segments in the corresponding datastore suitcases are identified. At 607, reference counts associated with the segments are decremented. If the reference count does not reach zero or a value indicating that no files referencing the segment, datastore suitcase modification is complete at 609. If the reference count reaches zero or a value indicating that no files are referencing the segment, the segment is deleted from the datastore suitcase at 611. Individual extents corresponding to the now deleted segment can be used to hold portions of new segments at 613 without requiring recompaction.

Figure 7:
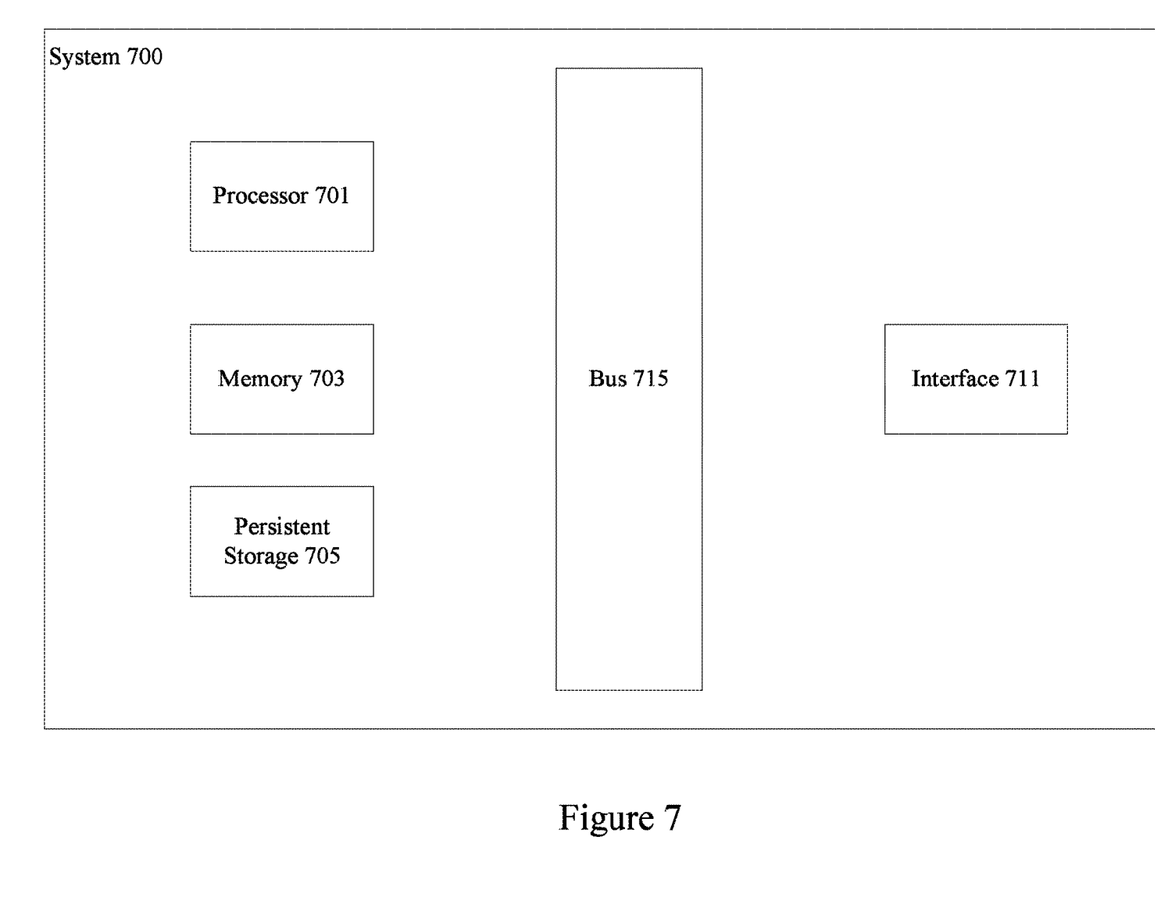
FIG. 7 illustrates a particular example of a storage system.

A variety of devices and applications can implement particular examples of the present invention. FIG. 7 illustrates one example of a system that can be used as a storage node in a deduplication system. According to particular example embodiments, a system 700 suitable for implementing particular embodiments of the present invention includes a processor 701, a memory 703, an interface 711, persistent storage 705, and a bus 715 (e.g., a PCI bus). When acting under the control of appropriate software or firmware, the processor 701 is responsible for such tasks such as optimization. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 705 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
   receiving a data stream at an interface;
   performing segment boundary identification and segment fingerprinting to generate a plurality of variable size segments including a first segment;
   determining whether the first segment is maintained in storage;
   determining a first number of fixed sized extents in the storage needed to maintain the first segment;
   maintaining the first segment in a plurality of contiguous fixed size extents in the storage, wherein after the first segment is deleted, the plurality of contiguous fixed size extents in the storage used to maintain the now deleted first segment are used to maintain portions of a plurality of new segments without having to perform recompaction.

2. The method of claim 1, wherein the plurality of variable size segments includes a second segment having a second segment size different from a first segment size.

3. The method of claim 1, wherein a first reference count is associated with the first segment.

4. The method of claim 3, wherein the first segment is deleted when the first reference count indicates that the segment is no longer mapped to any file.

5. The method of claim 1, wherein the first segment is maintained in one or more datastore suitcases in the storage.

6. The method of claim 1, wherein determining whether the first segment is maintained in storage includes accessing a deduplication dictionary.

7. The method of claim 1, wherein the first segment is maintained in a plurality of non-contiguous fixed size extents in the storage.

8. The method of claim 7, wherein after the first segment is deleted, the plurality of non-contiguous fixed size extents in the storage used to maintain the now deleted first segment are used to maintain portions of a plurality of new segments without having to perform recompaction.

9. The method of claim 6, wherein the deduplication dictionary is accessed using a first fingerprint corresponding to the first segment.

10. A system comprising:
an interface operable to receive a data stream;
a hardware processor operable to perform segment boundary identification and segment fingerprinting to generate a plurality of variable size segments including a first segment and determining whether the first segment is maintained in storage;
wherein a first number of fixed sized extents in the storage needed to maintain the segment is determined;
wherein the processor is further operable to maintain the first segment in a plurality of contiguous fixed size extents in the storage,
wherein after the first segment is deleted, the plurality of contiguous fixed size extents in the storage used to maintain the now deleted first segment are used to maintain portions of a plurality of new segments without having to perform recompaction.

11. The system of claim 10, wherein the plurality of variable size segments includes a second segment having a second segment size different from a first segment size.

12. The system of claim 10, wherein a first reference count is associated with the first segment.

13. The system of claim 12, wherein the first segment is deleted when the first reference count indicates that the segment is no longer mapped to any file.

14. The system of claim 10, wherein the first segment is maintained in one or more datastore suitcases in the storage.

15. The system of claim 10, wherein determining whether the first segment is maintained in storage includes accessing a deduplication dictionary.

16. The system of claim 10, wherein the first segment is maintained in a plurality of non-contiguous fixed size extents in the storage.

17. The system of claim 16, wherein after the first segment is deleted, the plurality of non-contiguous fixed size extents in the storage used to maintain the now deleted first segment are used to maintain portions of a plurality of new segments without having to perform recompaction.

18. The system of claim 15, wherein the deduplication dictionary is accessed using a first fingerprint corresponding to the first segment.

19. A non-transitory computer readable storage medium comprising instructions for:
receiving a data stream at an interface;
performing segment boundary identification and segment fingerprinting to generate a plurality of variable size segments including a first segment;
determining whether the first segment is maintained in storage;
determining a first number of fixed sized extents in the storage needed to maintain the first segment;
maintaining the first segment in a plurality of contiguous fixed size extents in the storage,
wherein after the first segment is deleted, the plurality of contiguous fixed size extents in the storage used to maintain the now deleted first segment are used to maintain portions of a plurality of new segments without having to perform recompaction.

20. The non-transitory computer readable medium of claim 19, wherein the plurality of variable size segments includes a second segment having a second segment size different from a first segment size.

* * * * *